United States Patent
Li et al.

(10) Patent No.: US 7,333,294 B1
(45) Date of Patent: Feb. 19, 2008

(54) PERPENDICULAR WRITER WITH REDUCED SIDE TRACK WRITING

(75) Inventors: Shaoping Li, Richfield, MN (US);
Wenzhong Zhu, Richfield, MN (US);
Lei Wang, Apple Valley, MN (US);
Rick Michel, Minneapolis, MN (US);
David Kaiser, Apple Valley, MN (US);
Dean C. Palmer, Minneapolis, MN (US); Taras G. Pokhil, Arden Hills, MN (US); Ned Tabat, Chanhassen, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 762 days.

(21) Appl. No.: 10/323,507

(22) Filed: Dec. 18, 2002

Related U.S. Application Data (60) Provisional application No. 60/342,414, filed on Dec. 18, 2001.

(51) Int. Cl.
*G11B 5/147* (2006.01)

(52) U.S. Cl. .................................................... 360/126
(58) Field of Classification Search ............... 360/126, 360/125
See application file for complete search history.

(56) References Cited

U.S. PATENT DOCUMENTS

| | | | |
|---|---|---|---|
| 5,157,570 A * | 10/1992 | Shukovsky et al. | 360/126 |
| 5,495,379 A | 2/1996 | McNeil et al. | 360/125 |
| 6,122,144 A | 9/2000 | Chang et al. | 360/122 |
| 6,229,673 B1 | 5/2001 | Shinohara et al. | 360/246.2 |
| 6,282,056 B1 | 8/2001 | Feng et al. | 360/126 |
| 6,339,523 B1 | 1/2002 | Santini | 360/317 |
| 6,339,872 B1 | 1/2002 | Chang et al. | 29/603.14 |
| 6,385,008 B1 | 5/2002 | Santini et al. | 360/126 |
| 2002/0191320 A1 * | 12/2002 | Coffey et al. | 360/59 |

* cited by examiner

*Primary Examiner*—David Davis (57) ABSTRACT

A disc drive head that includes a shared pole having high magnetic anisotropy layer which locally decreases the amplitude of dynamic field excitation of the shared pole at the write operation frequency to reduce side-writing of a disc media during a write operation.

13 Claims, 11 Drawing Sheets

Wall motion ←

FIG.8

Wall motion →

PERPENDICULAR WRITER WITH REDUCED SIDE TRACK WRITING

This application claims priority to U.S. Provisional Patent Application No. 60/342,414, filed on Dec. 18, 2001.

FIELD OF THE INVENTION

The present invention relates generally to disc drives and more particularly to disc drives with heads that are configured to reduce side track writing.

BACKGROUND OF THE INVENTION

In magnetic disc drives, side track writing may occur when magnetic fields influence the storage media beyond an intended write track. A typical magnetic disc drive is designed to write data to a disc by influencing the disc with a series of magnetic fields that are generated by a disc drive head. The magnetic field is provided through a top pole and a return pole which are located in close proximity to the disc media. The magnetic flux is intended to be channeled through a narrow path between the top pole and the return pole to write a main data track. However, it is difficult to obtain absolute control of the magnetic flux, and at least some undesired flux leakage frequently occurs in many drives. When the magnitude of this flux leakage is large enough, the leakage field can write an additional track, or "side track," on the media.

Side track writing may be detrimental to data integrity and longevity as well as storage density. When a side track writes near or over a previously written main track, the integrity of that track may be jeopardized. This may be particularly true when a main track is subjected to multiple side track writings. Over time, the main track may degrade from multiple over-writes, even if the side track effect is weak.

Side track writing may also compromise storage density on the media. One way to increase storage density is to make data tracks narrower to permit an increased number of adjacent tracks to be written to a disk. However, the presence of side track writing may constrain the extent to which track density can be increased, in part because a narrower data track may be more vulnerable to side track writing.

Various methods have been proposed to reduce side writing. For example, various pole tip shapes have been proposed, including an hourglass shaped pole tip, a head having a tapered pedestal that separates the top pole, "I" shaped pole. The variations in pole shape geometry may reduce the opportunity for leakage fields to write side tracks on the media. However, varying the pole tip shape does not necessarily eliminate side track writing.

Improved methods and systems for reducing side track writing are needed.

SUMMARY OF THE INVENTION

A media writing head of the type that magnetically writes data to a media at a write operation frequency includes a top pole and a return pole. The return pole is located proximate the top pole and has a dynamic field excitation during a write operation. A high magnetic anisotropy layer on the return pole locally decreases the amplitude of dynamic field excitation of the return pole at the write operation frequency to reduce side-writing of the media during a write operation. The media writing head has a ferromagnetic resonance frequency. The high magnetic anisotropy layer locally increases the ferromagnetic resonance frequency of the return pole.

In one embodiment, the media writing head has a top surface that is proximate the top pole and the high magnetic anisotropy layer is located at the return pole top surface. The return pole is formed of a material that has a ferromagnetic resonance frequency that is greater than the write operation frequency. The high anisotropy layer locally increases the magnetic resonance frequency to further exceed the write operation frequency. This shift reduces the amplitude of dynamic field excitation to suppress the occurrence of side-writing of the media. Side writing may not necessarily be eliminated entirely but is at least reduced.

In one embodiment, the top pole has a top surface and a bottom surface. The return pole has an air bearing surface and a top surface that is spaced from the bottom surface of the top pole to define a gap. The high anisotropy may be formed at top surface of the return pole. Flux leakage from the top pole to the return pole induces a domain in the shared pole. The domain has a domain wall that intersects the return pole top surface and the air bearing surface. The domain is at least partially closed at the domain wall. The high anisotropy layer may include the portion of the shared pole where domain wall intersects the return pole top surface and the air bearing surface.

When the head of the top pole is subject to a magnetic flux, the magnetic flux is typically imperfectly closed within the top pole and leaking into the return pole. Locally decreasing the amplitude of dynamic excitation of the return pole at the recording frequency decreases the magnitude of the pulsating magnetic field to decrease side writing of a media.

The high magnetic anisotropy layer may include a portion of the return pole that has been subject to antiferromagnetic biasing. In one embodiment, the high magnetic anisotropy layer may include a layer of high anisotropy magnetic material that has been deposited on the return pole. In another embodiment, the high magnetic anisotropy layer may include a permanent magnet layer at the return pole top surface.

In another embodiment, a data storage device of the type that magnetically writes data to a media at a write operation frequency includes a media for storing data, and a media writing head for writing data to the media. The media writing head includes a top pole and a return pole proximate the top pole. During a write operation, the return pole has a dynamic field excitation. A high magnetic anisotropy layer on the return pole locally decreases the amplitude of dynamic field excitation of the return pole at the write operation frequency to reduce side-writing of the media during a write operation.

The return pole may have a ferromagnetic resonance frequency that is greater than the write frequency of the disc drive. In one embodiment, the data storage device may also include a bottom shield and a read sensor for reading data from the media.

In another embodiment, a magnetic storage device includes a magnetically recordable media and a write head. The write head has portions with locally distinct magnetic anisotropy for locally varying the amplitude of dynamic magnetic field excitation for a predetermined frequency. The high magnetic anisotropy layer dampens the dynamic distortion of spin structure in at least one head component to reduce the magnitude of the pulsating magnetic field.

In one embodiment, the writing head may include portions formed from a material that has a magnetic anisotropy that is greater than the magnetic anisotropy of other portions of the device. This may be accomplished by adding a layer of high anisotropic material to one or more head components. In one embodiment, the layer may be formed from CoFeHf, CoCrPt, PtMn, and NiMn.

In one embodiment, increased magnetic anisotropy may be added to the return pole. In one embodiment, the return pole may function as a shared pole in a read-write head.

DETAILED DESCRIPTION OF THE PREFERRED EMBODIMENT

Figure 1:
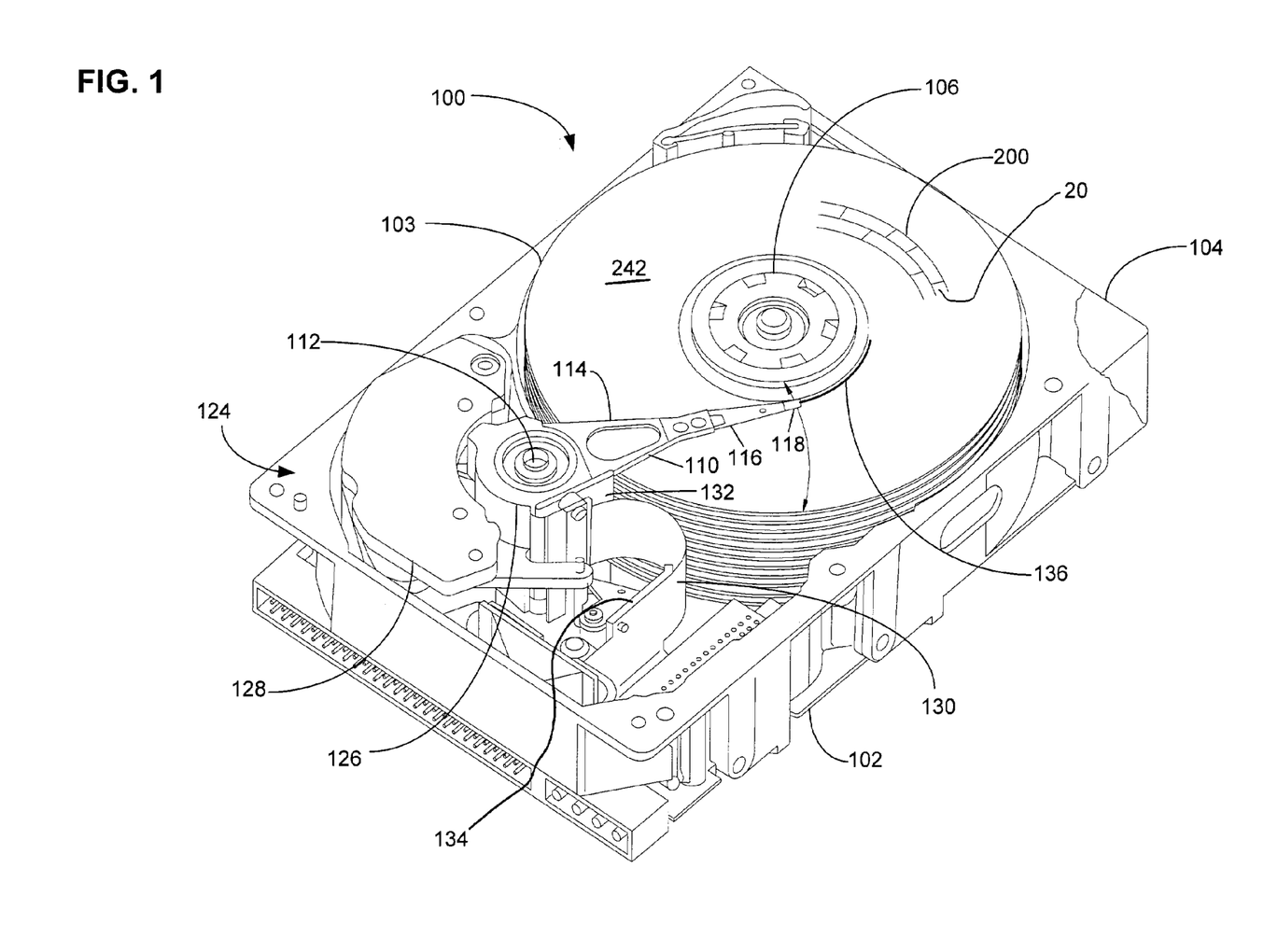
FIG. 1 is a perspective view of a disc drive showing the primary internal components.
Figure 2:
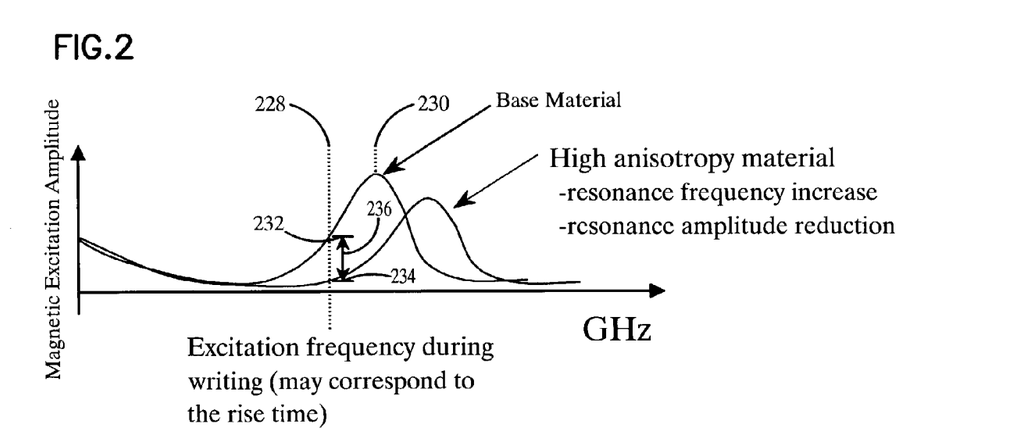
FIG. 2. is a graph that shows how increasing the anisotropy of a surface may shift the ferromagnetic resonance frequency to reduce the amplitude of magnetic excitation at a specified frequency.

A disc drive 100 constructed in accordance with a preferred embodiment of the present invention is shown in FIG. 1. The disc drive includes a head 118 having a shared pole 206 (or return pole) that has a high anisotropy layer 224 at its top surface 209 for reducing the amplitude of dynamic excitation of spin structure at the shared pole top surface thereby decreasing the magnitude of a pulsing magnetic field that can be responsible for side track writing. As shown in FIG. 2, a high anisotropic material may be used to shift the ferromagnetic resonance frequency away from the drive's write frequency. This shift also reduces the excitation amplitude at the write frequency.

Referring now to FIG. 1, the disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108 to read from or write to tracks 136 on the disc.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of all actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

The information stored on the disc 108 is typically arranged in concentric tracks 200 which may be divided into sectors 202, as shown in FIG. 1. Although the tracks 200 and sectors 202 are illustrated in FIG. 1 for under-standing of the present invention, they do not actually appear on the surface of the magnetic disc 108. While a disc drive 100 typically comprises multiple discs 108 and multiple heads 118 as shown in FIG. 1, for the purposes of the following description, reference will be made to a singular disc and a singular head.

Figure 3:
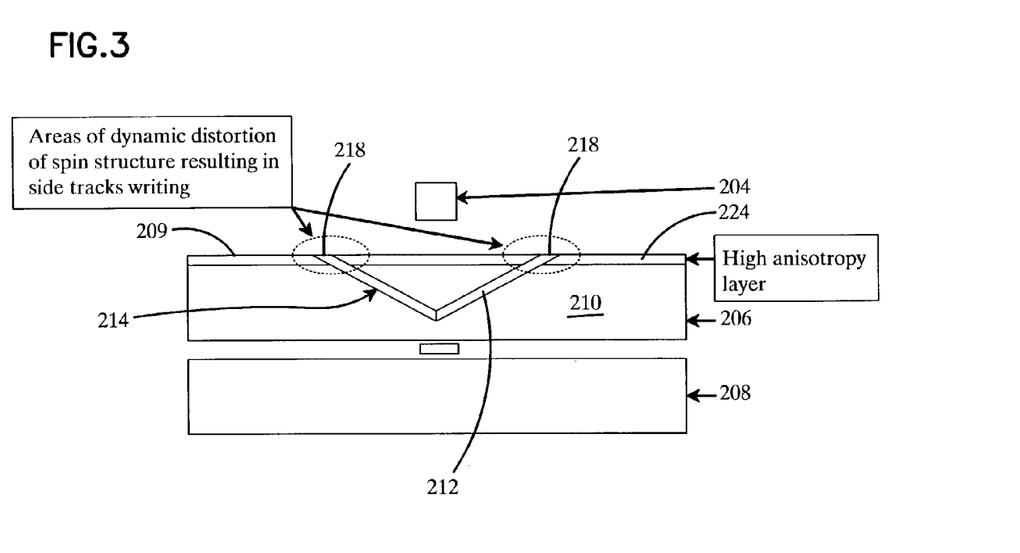
FIG. 3 is an end view of a disc drive head showing a domain in a shared pole that is induced by flux leakage from the top pole.
Figure 4:
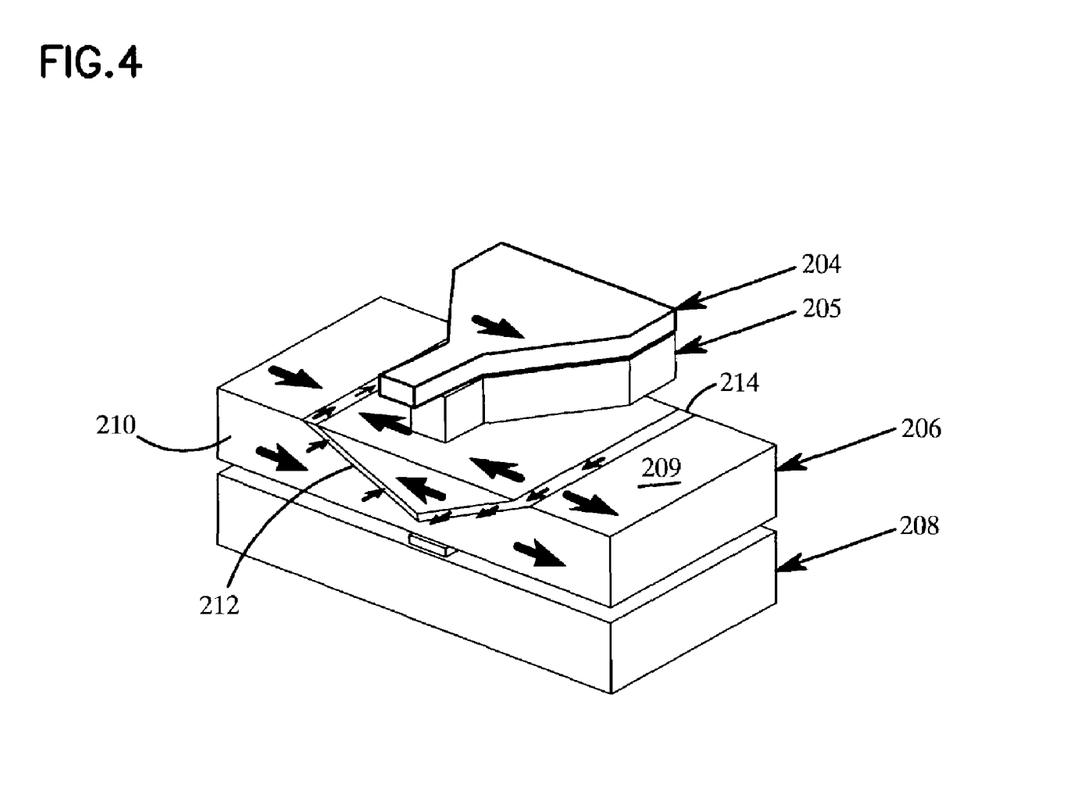
FIG. 4 is a perspective view of a disc drive head showing a domain in a shared pole that is induced by flux leakage from the top pole.

As shown in FIGS. 3 and 4, a disc drive head 118 includes a top pole 204 and a return pole 206. In a read-write head, the return pole may function as a shared pole 206, and the head may further comprise a bottom shield 208 and a read sensor. For the purpose of this description the return pole will be referred to as the "shared pole" 206.

The top pole 204 may be mounted on a yoke 205 which resides between the top pole and a top surface 209 of the shared pole 206. An air bearing surface 210 allows the head 118 to fly in close proximity above a corresponding surface of the associated disc media 108. Through methods known to one skilled in the art, data may be written to the disc by manipulation of the magnetic field emanating from the top pole 204.

Figure 5:
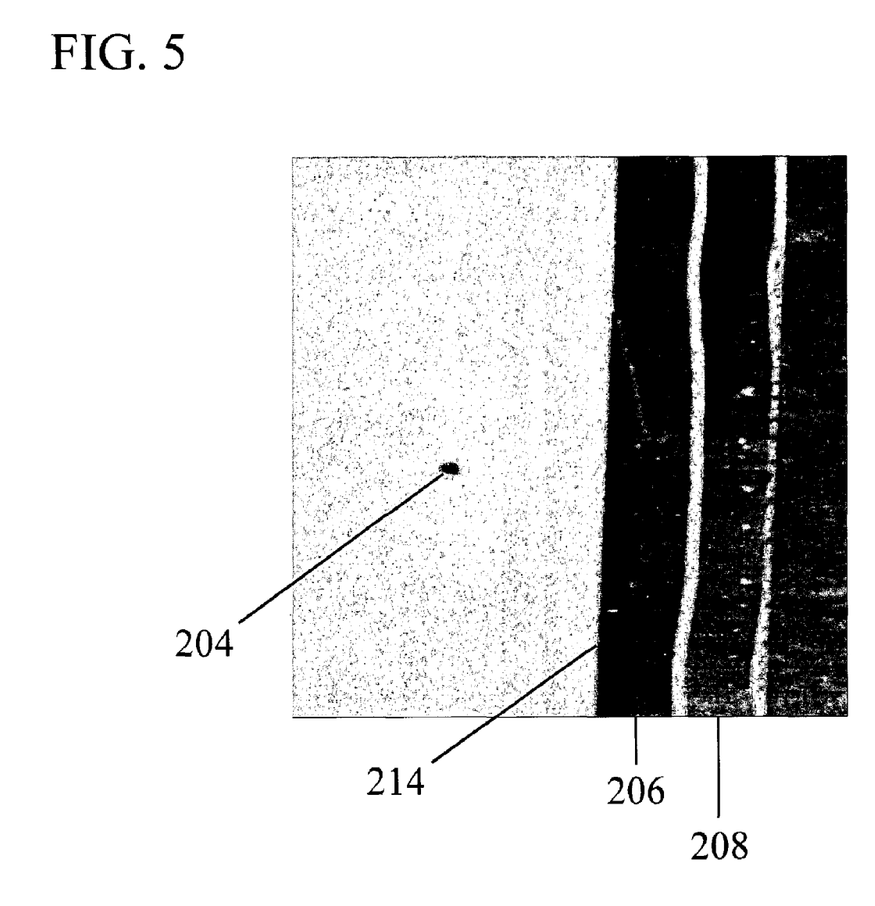
FIG. 5 is a magnetic force microscope image showing an end view of a top pole, a shared pole with a flux leakage induced domain, and a bottom shield.
Figure 6:
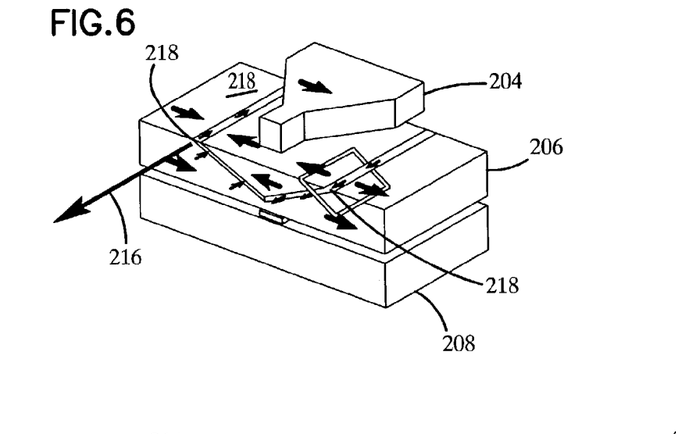
FIG. 6 is a schematic perspective view of a disk drive head depicting a maximum induced magnetic leakage field in relation to a domain in a shared pole.

As depicted in FIGS. 3 and 4, magnetic flux (illustrated by arrows) is not perfectly closed within the top pole 204—part of the flux leaks from the top pole into shared pole 206. This results in the formation of a triangular domain 212 in the shared pole 206. The triangular domain 212 is a type of flux closure feature between the top pole 204 and the shared pole 206. The triangular domain 212 includes a domain wall 214 that intersects the air bearing surface 210 and the top surface 209 of the shared pole 206. A magnetic force microscope (MFM) image of a perpendicular writer showing the triangular domain in the shared pole is provided in FIG. 5.

Figure 7:
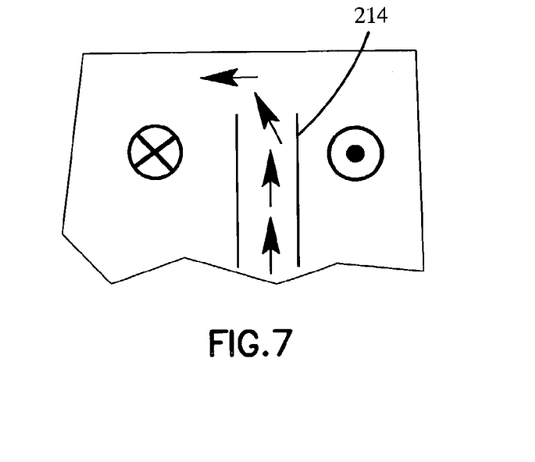
FIG. 7 is a cross-sectional view of a portion of the shared pole that depicts flux closure at an air bearing surface of the shared pole.
Figure 8:
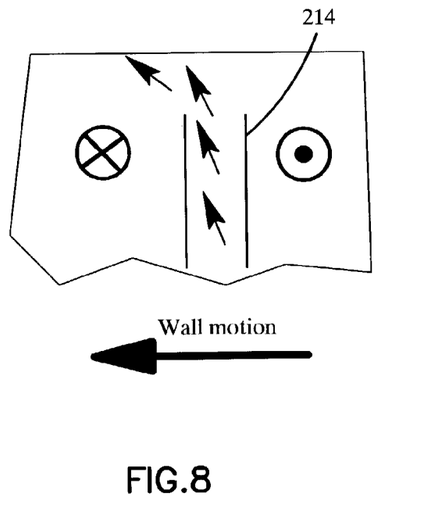
FIG. 8 is a cross-sectional view of a portion of the shared pole that depicts the effect of accelerating the shared pole in a first direction with respect to the write head.
Figure 9:
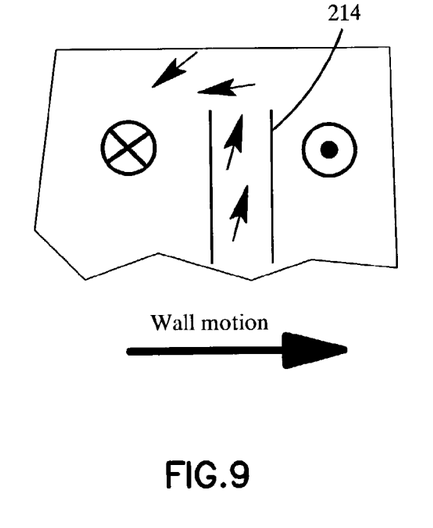
FIG. 9 is a cross-sectional view of a portion of the shared pole that depicts the effect of accelerating the shared pole in a second direction with respect to the write head.

The domain wall 214 has Bloch structure with Neel cap at the air bearing surface 210, as depicted in FIGS. 6 to 9. FIGS. 7 to 9 show cross sections taken perpendicular to the domain wall, indicated in FIG. 6. When the write head 118 is not powered, the shared pole and domain wall 214 does not move with respect to the top pole. In this state, shown in FIG. 7, the Neel cap closes the flux from Bloch portion of the wall within the shared pole 206, thus reducing the field emanating from the wall.

During a write operation, the domain wall 212 oscillates with respect to the top pole at the recording frequency of the write head 118. The periodic acceleration of the domain wall 214 dynamically distorts the domain wall structure and reduces the efficiency of the flux closure by the Neel cap, as depicted in FIGS. 8 and 9.

When the domain wall 214 is accelerated in one of the directions, it emanates a magnetic field perpendicular to the air bearing surface 210. The strongest distortion of the domain wall 214 and the strongest magnetic field 216 is most likely to occur at the points 218 where the domain wall 214 intersects both the air bearing surface 210 and the shared pole top surface 209. This magnetic field 216 is indicated schematically in FIG. 6 at one of the intersection points 218.

The periodic acceleration of the domain wall 214 generates a pulsing magnetic field that can cause writing of side tracks 220 on the media. The side track writing is stronger pronounced in perpendicular recording, because the media 108 is sensitive to the perpendicular field resulting from domain wall distortion. In this context, "perpendicular" means perpendicular to the media 108 and air bearing surface 210. In addition, the field may be increased by a magnetic imaging effect in a magnetically soft underlayer of the media.

Figure 10:
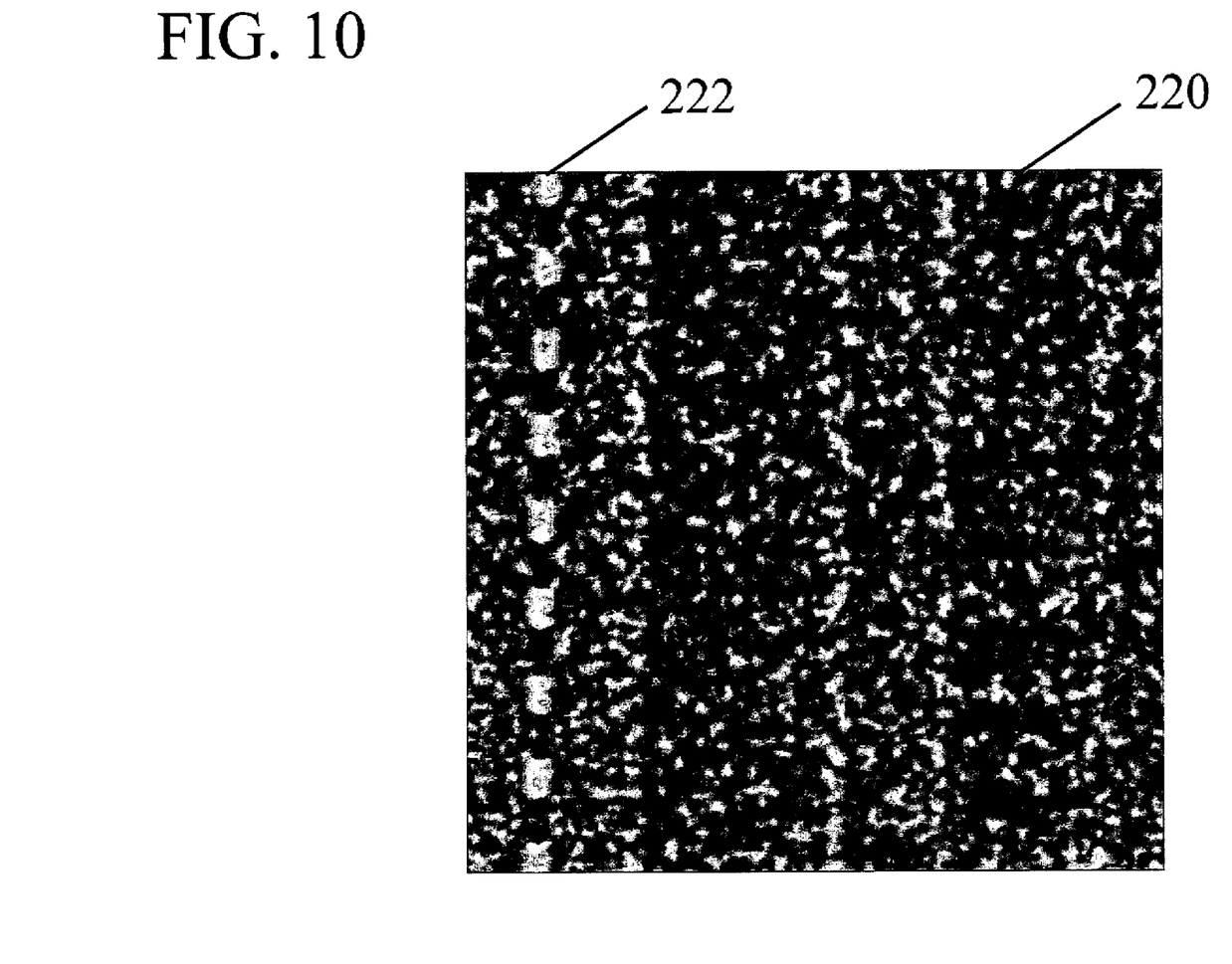
FIG. 10 is a magnetic force microscope image of a disc media showing a main track and a side track written at 10 MHz.
Figure 11:
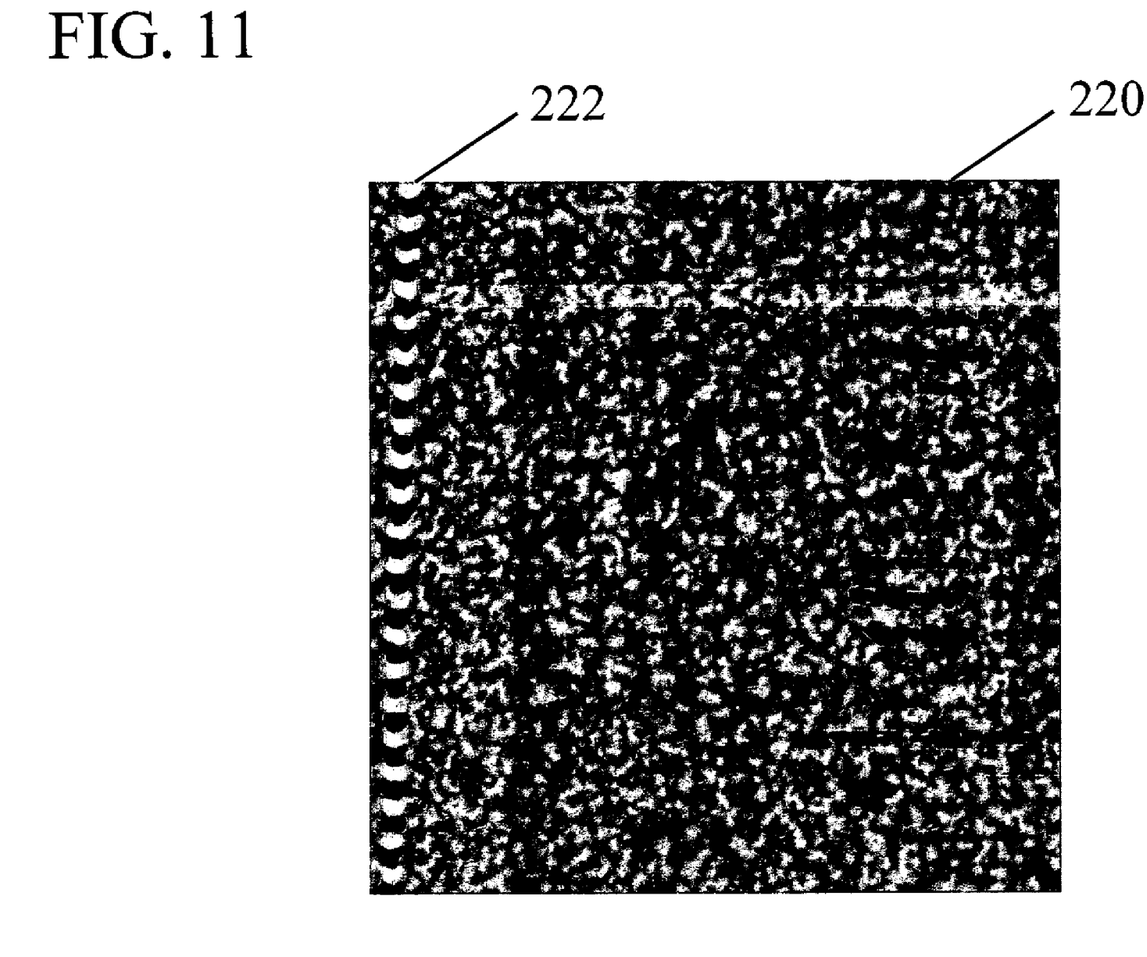
FIG. 11 is a magnetic force microscope image of a disc media showing a main track and a side track written at 25 MHz.
Figure 12:
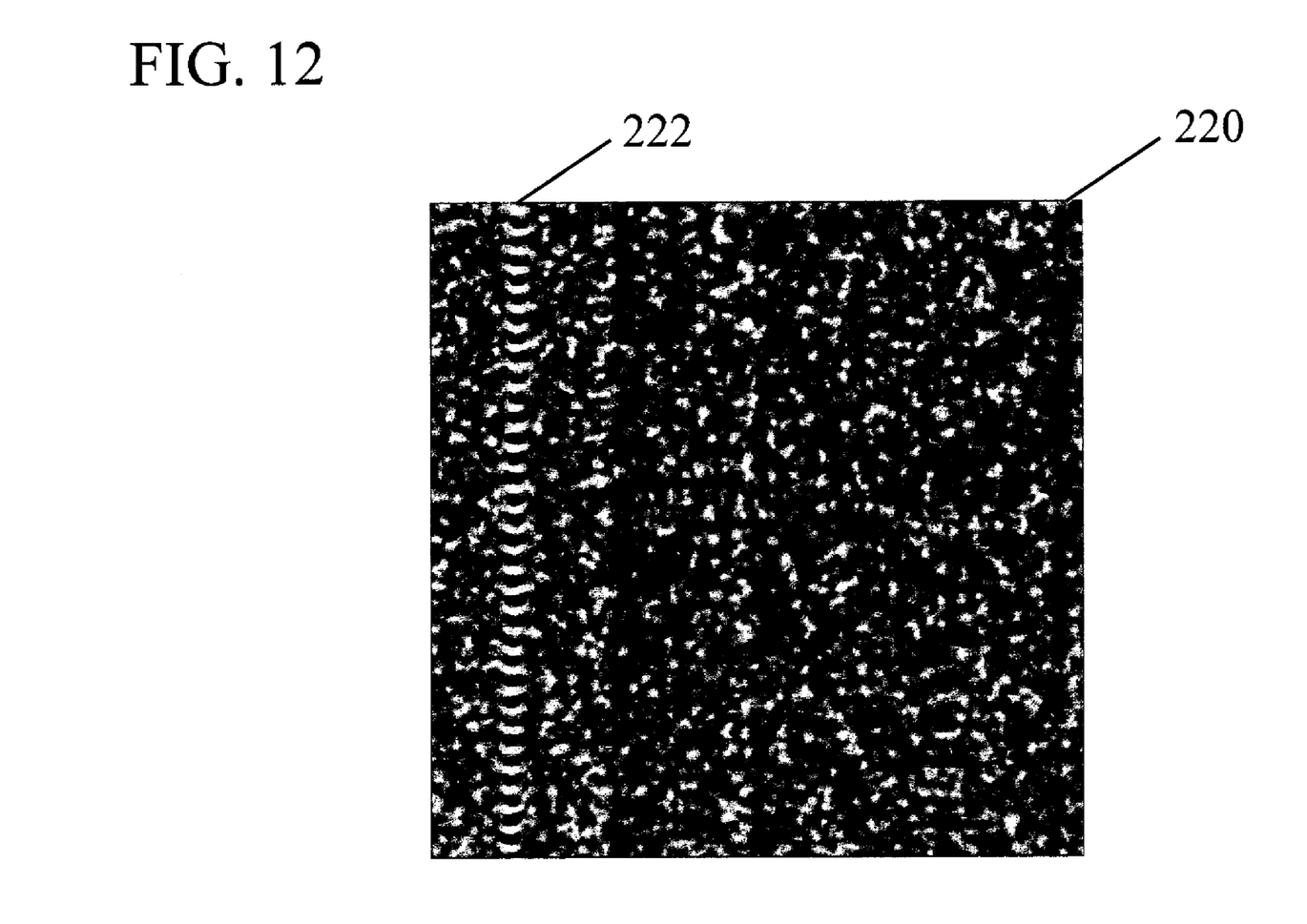
FIG. 12 is a magnetic force microscope image of a disc media showing a main track and a side track written at 40 MHz.
Figure 13:
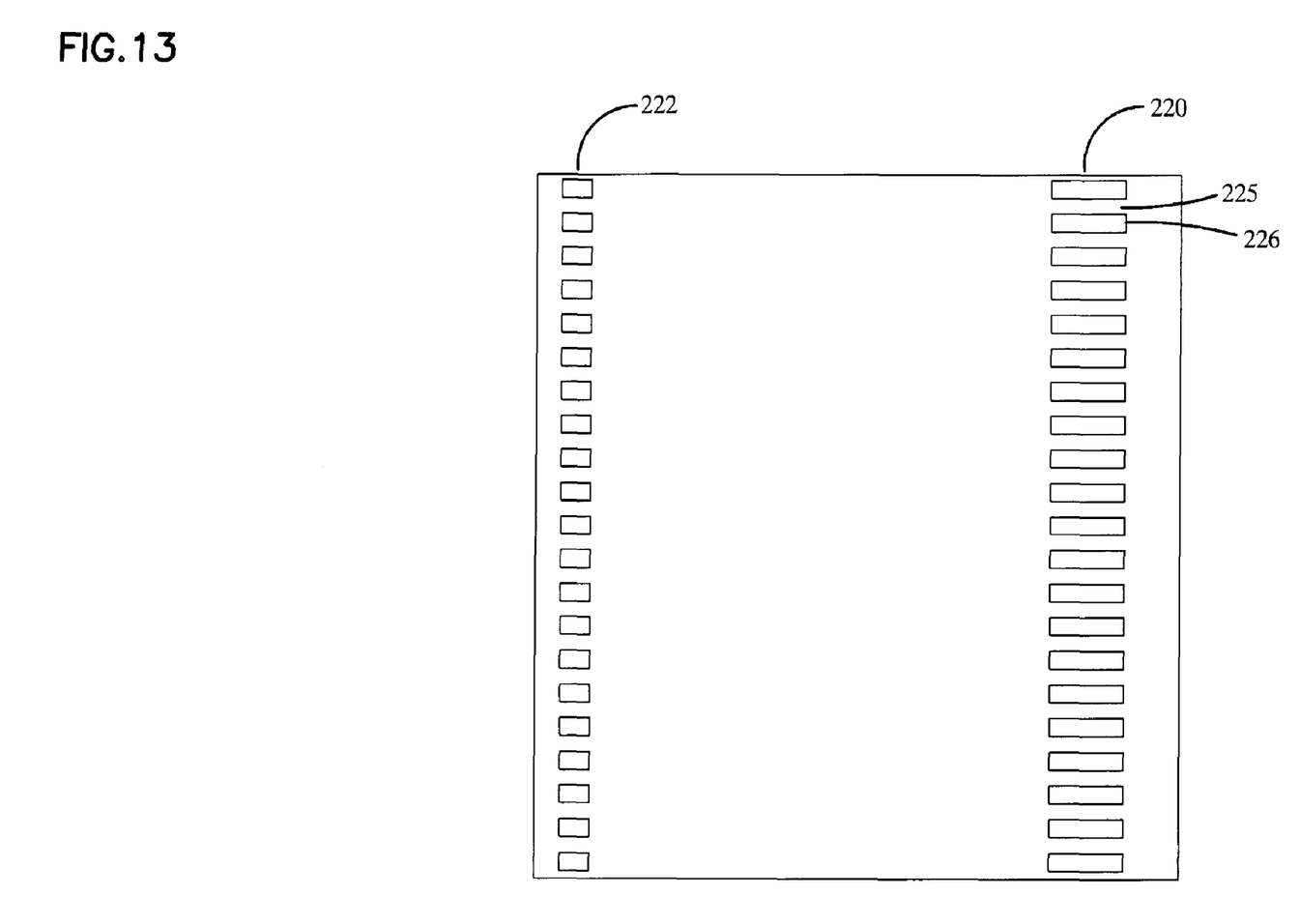
FIG. 13 is a schematic view of the magnetic force microscope image of FIG. 11 showing a main track and a side track.

Magnetic force microscope images of data tracks 222 and side tracks 220 at 10 MHz, 25 MHz, and 40 MHz are shown in FIGS. 10, 11, and 12, respectively. For clarity, FIG. 13 schematically illustrates the magnetic force microscope image of FIG. 11 with emphasis on the side tracks 220. The transitions between neutral areas 225 and dark areas 226 of the side track image correspond to the pulsing magnetic field that causes the side tracks. As can be seen in the figures, the distance between the transitions in the side tracks 220 and the main tracks 222 is the same, indicating that the frequencies of the side and main tracks are also the same.

Figure 14:
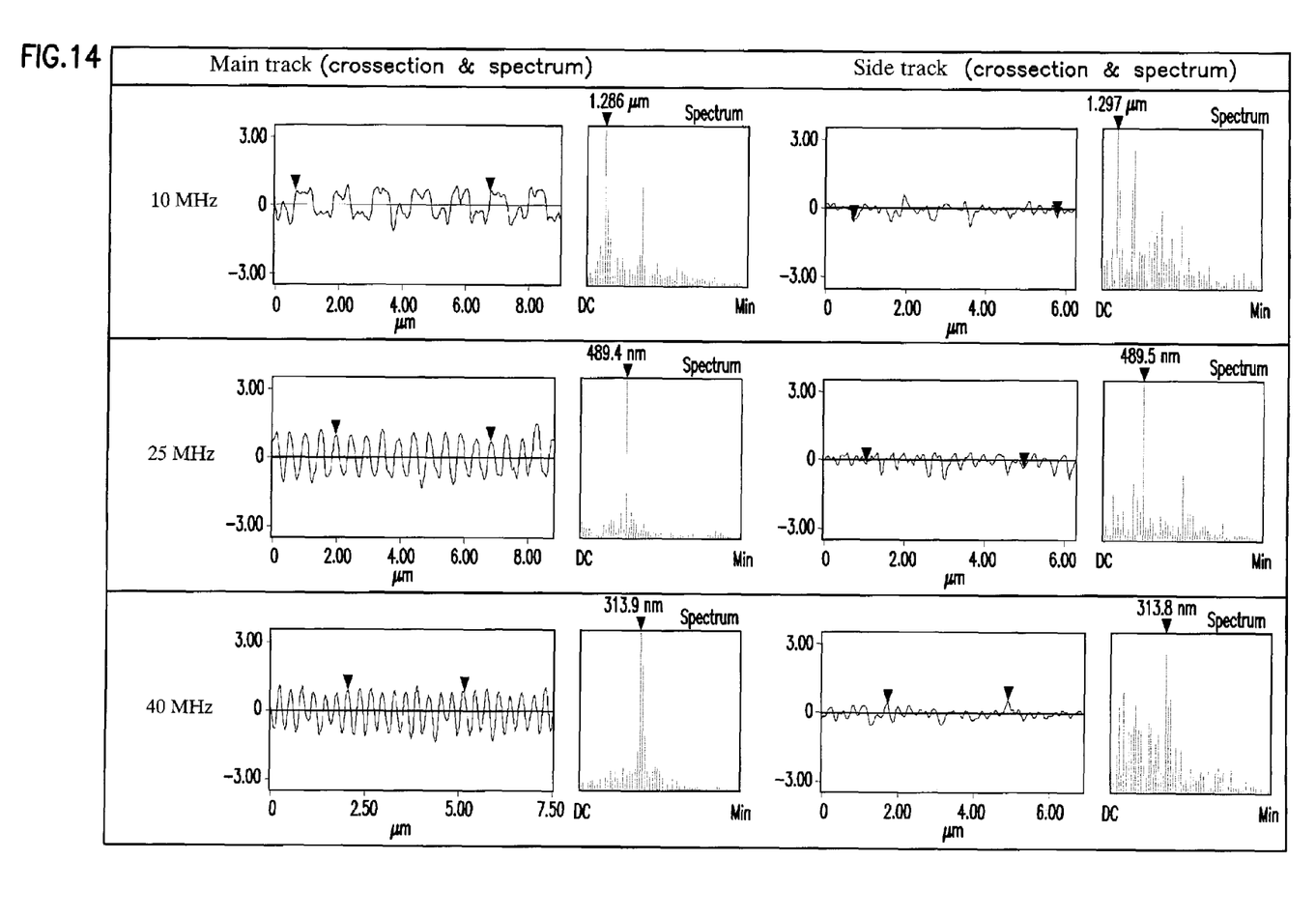
FIG. 14. is a series of graphs showing cross-sections and spectrums of the main tracks and side tracks shown in FIGS. 11-13.

FIG. 14 shows cross-sections of the tracks along with corresponding spectrums of the tracks. The spectrums are generated with a Fourier transform. It can be seen from FIG. 14 that the side tracks and main tracks have matching wavelengths at 10 MHz, 25 MHz, and 40 MHz.

The occurrence of these side tracks may be decreased by reducing the shared pole transient field caused by the domain wall oscillations. This may be accomplished by dampening the surface spin dynamics which allow for the magnetic field leakage during oscillation of the wall. One desirable location for dampening surface spin dynamics is the trailing edge of the shared pole.

As shown in FIG. 3, in one embodiment, a high anisotropy layer 24 on the surface of the shared pole may be provided to dampen surface spin dynamics and reduce the amplitude of dynamic excitation at the write frequency alleviate side track writing. In a preferred embodiment, the high anisotropy layer 24 may be located on the top surface 209 of the shared pole 206, as shown in FIG. 3. Alternatively, a high anisotropy layer may be located on other surfaces of the shared pole 206.

The effect of providing a high anisotropy layer is shown in FIG. 2. FIG. 2 shows the dynamic excitation amplitude 232 of a material across a range of frequencies. The write operation frequency 228 of a typical disc drive is typically lower than ferromagnetic resonance frequency 230 of the material which forms the shared pole, as depicted in FIG. 2.

Providing a high anisotropy layer 224 on the shared pole shifts the local ferromagnetic resonance frequency 230 farther away from the write operation frequency 228, i.e. to the right in FIG. 2, as indicated by the shifted curve in FIG. 2. As can also be seen from FIG. 2, increasing the anisotropy also results in a reduction 236 of the amplitude 232, 236 of dynamic excitation of spin structure at the write frequency. The reduction in excitation amplitude also corresponds to a reduction in the magnitude of the pulsing magnetic field that is responsible for writing side tracks.

Figure 15:
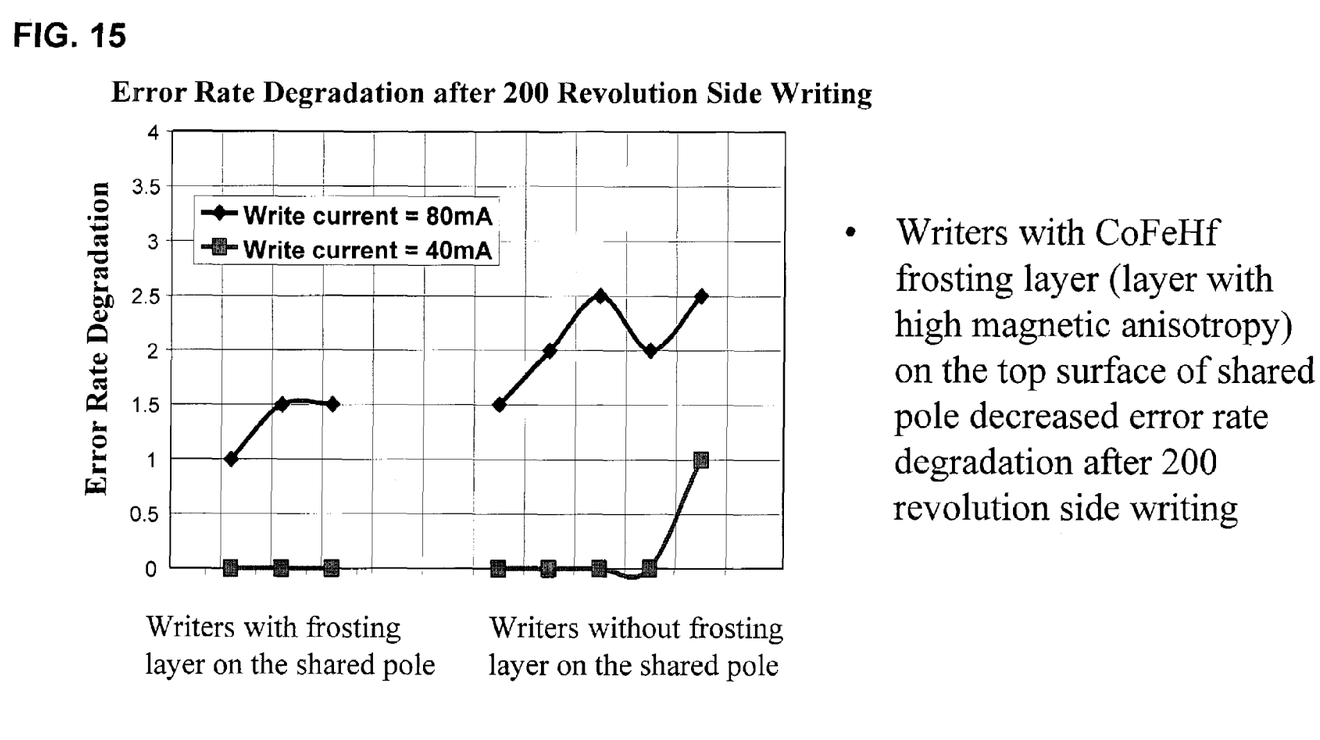
FIG. 15 is a graph showing error rate degradation after 200 revolutions for frosted and non-frosted shared poles with a write current of 80 milli-Amps and 40 milli-Amps.

In one embodiment, a high anisotropy layer 224 may be created through induced surface anisotropy, e.g. antiferromagnetic biasing. A high anisotropy layer may also be created by depositing a "frosting" layer of high anisotropy magnetic material on the shared pole. The layer may for example be CoFeHf (Hk~60 Oe, 4πMs~1.6 T) or any other magnetic material with high anisotropy. In a preferred embodiment, the high anisotropy layer thickness should be at least that of the domain wall width in the shared pole (50-200 nm). As shown in FIG. 15, tests with a CoFeHf frosting layer on the shared pole have shown a reduction in error rate degradation.

High magnetic anisotropy can be also introduced in the shared pole by depositing a permanent magnet layer (CoCrPt or other permanent magnet materials) on the pole surface, or by biasing the surface with an antiferromagnetic layer (PtMn, NiMn or other anti-ferromagnetic materials). However, those of skill in the art will appreciate that one potential problem which can result from using permanent magnet or anti-ferromagnetic biasing of the shared pole surface is the noncollinear micromagnetic state. Noncollinearity of the state results from isotropic distribution of grain easy axes in the plane of permanent magnet or anti-ferromagnetic films.

While the system is shown having a region of increased anisotropy on the shared pole, it may be desirable to provide other components with increased anisotropy regions to reduce errant magnetic fields.

In addition, while the embodiments discussed generally refer to a system having a write frequency that is lower than the ferromagnetic resonance frequency, it may be possible to construct a system with a write frequency that exceeds the ferromagnetic resonance frequency, in which case it may be desirable to provide a region of reduced magnetic anisotropy to reduce side writing.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A writer comprising:
   a) a top pole wherein the top pole has a top surface and a bottom surface;
   b) a return pole arranged and configured proximate the top pole, the return pole having a dynamic field excitation during the write operation wherein the return pole has an air bearing surface and a top surface that is spaced from the bottom surface of the top pole to define a gap and flux leakage from the top pole to the return pole induces a domain in the return pole, the domain having a domain wall that intersects the return pole top surface and the air bearing surface, the domain being at least partially closed at the domain wall; and
   c) a high magnetic anisotropy layer on the return pole wherein the high anisotropy layer comprises a portion of the return pole where the domain wall intersects the return pole top surface and the air bearing surface.

2. The writer of claim 1 wherein the return pole has a ferromagnetic resonance frequency, and further wherein the high magnetic anisotropy layer locally increases the ferromagnetic resonance frequency of the return pole.

3. The writer of claim 1 wherein the return pole comprises a material having a ferromagnetic resonance frequency that is greater than the write operation frequency.

4. The writer of claim 3 wherein the high anisotropy layer locally increases the magnetic resonance frequency to further exceed the write operation frequency, thereby locally reducing the amplitude of dynamic field excitation to suppress the occurrence of side-writing of the media.

5. The writer of claim 1 wherein flux leakage from the return pole results in a pulsating magnetic field, and wherein locally decreasing the amplitude of dynamic excitation of the return pole at the write operation frequency decreases the magnitude of the pulsating magnetic field.

6. The writer of claim 1 wherein the high magnetic anisotropy layer comprises a permanent magnet layer.

7. The writer of claim 1 wherein the high magnetic anisotropy layer comprises a portion of the return pole that has been subject to antiferromagnetic biasing.

8. A data storage device comprising:
   a media for storing data, and
   a writer arranged and configured proximate the media for writing data to the media, the writer comprising:
   a top pole wherein the top pole has a top surface and a bottom surface;
   a return pole arranged and configured proximate the top pole, the return pole having a dynamic field excitation during the write operation wherein the return pole has an air bearing surface and a top surface that is spaced from the bottom surface of the top pole to define a gap and flux leakage from the top pole to the return pole induces a domain in the return pole, the domain having a domain wall that intersects the return pole top surface and the air bearing surface, the domain being at least partially closed at the domain wall; and
   a high magnetic anisotropy layer on the return pole, wherein the high magnetic anisotropy layer locally decreases the amplitude of dynamic field excitation of the return pole at the write operation frequency to reduce side-writing of the media during a write operation and wherein the high anisotropy layer comprises a portion of the return pole where the domain wall intersects the return pole top surface and the air bearing surface.

9. The data storage device of claim 8 wherein the return pole has a ferromagnetic resonance frequency, the ferromagnetic resonance frequency of the return pole being greater than a write frequency of the data storage device.

10. The data storage device of claim 8 further comprising a bottom shield and a read sensor that are arranged and configured proximate the return pole for reading data from the media.

11. The data storage device of claim 8 wherein during a write operation the domain wall oscillates at the write operation frequency.

12. The data storage device of claim 11 wherein the oscillation of the domain wall induces a dynamic distortion of spin structure in portions of the return pole, thereby generating a pulsating magnetic field.

13. The data storage device of claim 12 wherein the high magnetic anisotropy layer on the return pole dampens the dynamic distortion of spin structure in the return pole to reduce the magnitude of the pulsating magnetic field.

* * * * *